(12) United States Patent
Niaura et al.

(10) Patent No.: US 6,352,143 B1
(45) Date of Patent: Mar. 5, 2002

(54) VIBRATION DAMPING SYSTEM USING A HYDRAULIC DAMPER WITH A FIELD RESPONSIVE FLUID CONTROL

(75) Inventors: William S. Niaura; Peyman Pakdel, both of Akron, OH (US)

(73) Assignee: Bridgestone/Firestone, Inc., Akron, OH (US)

( * ) Notice: Subject to any disclaimer, the term of this patent is extended or adjusted under 35 U.S.C. 154(b) by 0 days.

(21) Appl. No.: 09/521,317

(22) Filed: Mar. 9, 2000

(51) Int. Cl.⁷ .................................................. F16F 9/53
(52) U.S. Cl. ................................ 188/267.1; 188/267.2; 188/292; 188/302; 188/312; 188/313; 188/314; 188/318
(58) Field of Search ............................. 188/267.1, 318, 188/312, 292, 302, 314, 313, 267.2

(56) References Cited

U.S. PATENT DOCUMENTS

| | | | |
|---|---|---|---|
| 1,975,642 A | * 10/1934 | Landeweer | |
| 2,001,988 A | * 5/1935 | Temple | |
| 2,598,177 A | 5/1952 | Kalle | 60/52 |
| 3,137,137 A | 6/1964 | Kalle | 60/52 |
| 4,463,839 A | * 8/1984 | Ashiba | 188/381 X |
| 4,666,180 A | * 5/1987 | Shirakuma | 188/318 X |
| 4,887,699 A | 12/1989 | Ivers et al. | 188/378 |
| 4,926,985 A | 5/1990 | Mizuno et al. | 188/378 |
| 4,930,463 A | 6/1990 | Hare, Sr. | 123/90.11 |
| 5,016,909 A | * 5/1991 | Lin | 188/314 X |
| 5,145,024 A | * 9/1992 | Doi | 188/267 X |
| 5,161,653 A | 11/1992 | Hare, Sr. | 188/267 |
| 5,276,622 A | 1/1994 | Miller et al. | 364/24.05 |
| 5,276,623 A | 1/1994 | Wolfe | 364/424.05 |
| 5,293,969 A | * 3/1994 | Yamaoka et al. | 188/314 X |
| 5,752,891 A | 5/1998 | Meckstroth et al. | 474/110 |
| 5,934,422 A | * 8/1999 | Steed | 188/318 |
| 6,149,391 A | * 11/2000 | Pohl et al. | 188/267.1 X |
| RE37,015 E | * 1/2001 | Rensel et al. | 188/267.1 |

* cited by examiner

Primary Examiner—Joseph D. Pape
Assistant Examiner—Lori L Coletta
(74) Attorney, Agent, or Firm—Thomas R. Kingsbury; Michael Sand; John H. Hornickel (57) ABSTRACT

A vibration damping system for absorbing shock loads includes a hydraulic damper containing a piston slidably reciprocating within an oil filled chamber and dividing the chamber into a pair of subchambers. A hydraulic motor is in fluid communication with and located between the subchambers and is controlled by a field responsive fluid, such as an electrorheological (ER) actuated device. The hydraulic motor transforms fluid motion into rotating motion by a pair of meshing gears. The ER device is a flow cell and is connected to a shaft of one or both of the meshing gears. The magnitude of an electric field applied to the ER fluid controls the flow rate of the hydraulic fluid passing through the hydraulic motor by controlling the resistive force to the rotary motion of the gears. A plurality of check valves controls the direction of flow of the hydraulic fluid between the hydraulic motor and the subchambers.

19 Claims, 6 Drawing Sheets

VIBRATION DAMPING SYSTEM USING A HYDRAULIC DAMPER WITH A FIELD RESPONSIVE FLUID CONTROL

BACKGROUND OF THE INVENTION

1. Technical Field

The invention relates to vibration damping devices and systems which develop a controllable, user-adjustable damping-force when applied between two moving members, for applications such as automobile suspensions, industrial machinery, or other equipment. More particularly, the invention relates to a hydraulic damping system which uses a field responsive fluid such as an electrorheological (ER) fluid as the medium for controlling the damping performance of the device.

2. Background Information

In automotive vehicles and in other types of equipment which are subjected to vibration and shocks, various devices and systems are used to dampen, or lessen, the effect of the vibration. In automotive vehicles, vibrations are caused by traveling over road protrusions or depressions and are transmitted from the road surface, through the suspension, to the vehicle body. Vibration damping devices placed between the vehicle suspension and body are commonly used to damp these vibrations to maintain control of the vehicle and provide a smoother ride for occupants of the vehicle.

Typical automobile dampers are axially-sliding, oil-filled, hydraulic devices that produce a velocity dependant resistive, or damping force as they are compressed or extended. The damping force is generated via viscous/turbulent dissipation mechanisms associated with the flow of the hydraulic fluid through valves and passageways inside the damper.

Although such conventional devices have proven satisfactory for most applications, attempts to further refine ride-quality, while maintaining vehicle control, have identified a need for a damper with adjustable damping performance. In conventional hydraulic dampers, this tuneability is achieved by modifying the geometry of the flow-path. For example, an external motor may be connected to mechanisms within the damper such that motion of the motor alters the size of a metering orifice and/or the preload on a valve. In typical applications, an on-board computer monitors body and suspension motions to calculate an optimum damping performance and issues a control signal so that the damper is adjusted to the desired state.

A more recent development has evolved in which an electrorheological (ER), or field-responsive fluid is used within the chamber of the damper. One or more electrodes are provided within the device such that an applied voltage effects an increase in the ER fluid's viscosity. Since the fluid's viscosity varies in proportion with the intensity of the applied voltage, adjustability of damping performance is achieved by altering the physical properties of the fluid in the damper rather than the geometry of the flow path. In practice, this allows for a damper which can respond to a control signal more quickly than a conventional adjustable damper. U.S. Pat. Nos. 5,180,145; 5,316,112 and 5,366,048 are examples of such devices.

For certain applications, it has been found desirable to combine the known, durable construction of a conventional hydraulic damper with the adjustability and fast response of an ER damper. In such hybrid units, the damping energy is dissipated by viscous/turbulent dissipation mechanisms associated with the flow of the hydraulic fluid inside the damper. ER fluid is used in a separate control element to alter the characteristics of the flow path through which the hydraulic oil circulates. With proper design and placement of the control element, many of the ER damper's desirable properties can be maintained. Some examples of controllable hybrid dampers using an ER control fluid are shown in U.S. Pat. Nos. 5,161,653 and 5,752,891.

Although these prior art, hybrid dampers provide satisfactory solutions for certain applications, they possess several shortcomings. For example, U.S. Pat. No. 5,161,653, which is believed to be the closest prior art to that of the subject invention, discloses a hybrid ER/hydraulic fluid damper. However, the ER control element of this damper does not permit an increase in damping force during the course of a stroke beyond that which is achieved at time that the control element is energized. This means that in order to effect a maximum force response, the control element must be energized precisely at the end of a stroke when there is no flow. Consequently, if the system is not fast enough to react to an event, damping performance is compromised until the direction of the stroke is reversed. Therefore, it is desirable to provide a hybrid ER/hydraulic fluid damper in which the damping force can be controlled independently of other operating parameters such as stoke direction, velocity, frequency, or amplitude.

SUMMARY OF THE INVENTION

Objectives of the invention include providing an improved damping device and system using a field responsive fluid, such as an electrorheological and/or magnetorheological fluid, preferably of the type suitable for a vehicle suspension system, which solves the aforementioned problems of prior art hybrid ER/hydraulic dampers by providing a system that is fast enough to react to various forces exerted on the vehicle or equipment and which requires a relatively small amount of ER fluid and which does not subject such fluid to a harsh environment as in those dampers wherein the ER fluid is the main fluid contained within the piston chamber.

A further objective of the invention is to provide such a damping system which is able to independently change the magnitude of the damping force during the course of the stroke and in which the response time is in the millisecond time-frame, thereby enabling control of individual wheel motions in an automobile or similar vehicle.

A still further objective of the invention is to provide such a damping system which is significantly less costly than an electromechanical valve system that can respond in a similar time period, and in which a field responsive fluid cell containing the ER fluid is placed outside of the path of the main hydraulic fluid and can be serviced and/or replaced easily without affecting the integrity of the main body of the hydraulic damper.

A further objective of the invention is to provide such a damping system which has relatively few moving parts which are exposed to the ER fluid, and which requires a minimum amount of field responsive fluid and is therefore less expensive to construct and maintain.

Another objective of the invention is to provide such a damping system which is similar in many respects to conventional hydraulic dampers as to size and means of attachment to the vehicle thereby enabling the damping system to be utilized in existing spaces intended for conventional type hydraulic dampers yet is able to provide the desired versatilities of dampers required to contain the ER fluid as the replacement for the heretofore hydraulic fluid.

A further objective of the invention is to provide such a damping system which is of a rugged, compact, relatively lightweight simple design and which achieves the stated objectives in a simple and efficient manner.

These objectives and advantages are obtained by the improved vibration damping system of the present invention, the general nature of which may be stated as including a hydraulic damper including a housing forming an internal hydraulic fluid chamber and a damping member slidably reciprocating within said chamber and dividing said chamber into a pair of subchambers, said damping member being adapted to be connected to a first support structure; connection means on the housing for connecting said housing to a second support structure spaced from said first support structure; a hydraulic motor in fluid communication with the hydraulic damper for controlling the movement of hydraulic fluid between the subchambers upon movement of the damping member within the fluid chamber; a fluid line providing the fluid communication between the hydraulic motor and the fluid subchambers, said motor being mounted in said fluid line which said hydraulic fluid flows through said motor; and a flow cell adapted to contain a field responsive fluid operatively connected to the hydraulic motor for controlling the amount of damping of the vibration damper by controlling the hydraulic motor by regulating the amount of pressure required to pass a fixed amount of hydraulic oil through said hydraulic motor.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

The improved vibration damping system of the present invention is indicated generally at 1, and is shown particularly in FIGS. 1–6. Damping system 1 includes as its main components a usual hydraulic damper indicated generally at 2, consisting of an outer cylindrical housing or cylinder 3 which has an internal fluid chamber 4 which contains a usual hydraulic fluid such as oil. A damping member indicated generally at 6, is slidably reciprocally mounted within chamber 4 and includes a usual piston 7 and a piston rod 8. Piston 7 divides chamber 4 into a pair of subchambers 4A and 4B which vary in size as the piston slides within chamber 4. Piston rod 8 will be connected to a support structure 5 such as one part of a vehicle, as by a threaded end 10 (FIG. 1), with housing 3 having an attachment device such as a bushing 11, secured thereto for mounting the housing on another spaced component 5A of the vehicle so that as the two spaced components move with respect to each other piston 7 will slide within housing 3. These components are well known in the art and can have other arrangements than that shown in the drawings without affecting the concept of the invention.

Figure 3:
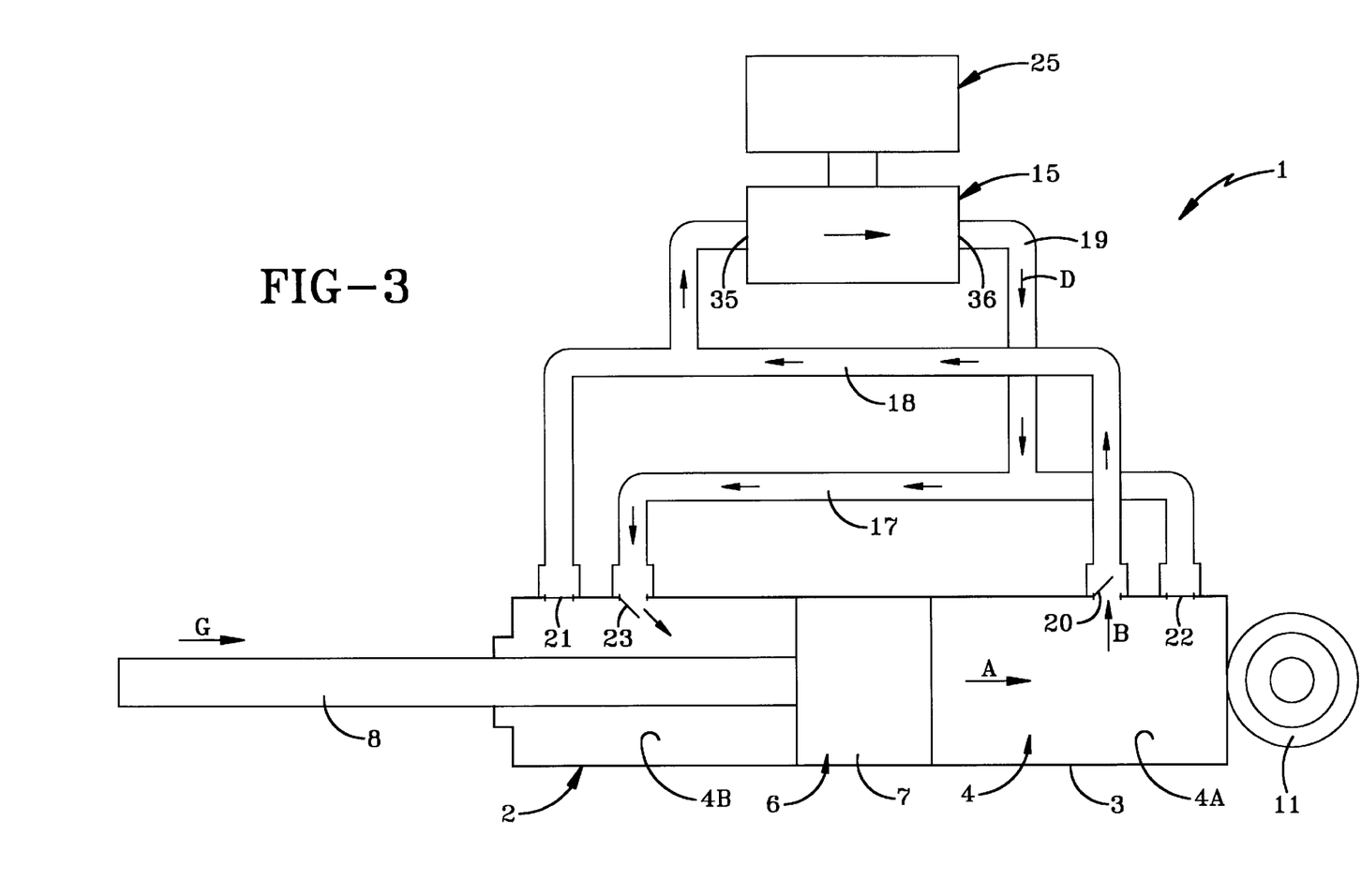
FIG. 3 is a diagrammatic view of FIG. 1 showing the movement of the hydraulic fluid as the piston is moving toward the right end of the cylinder.
Figure 4:
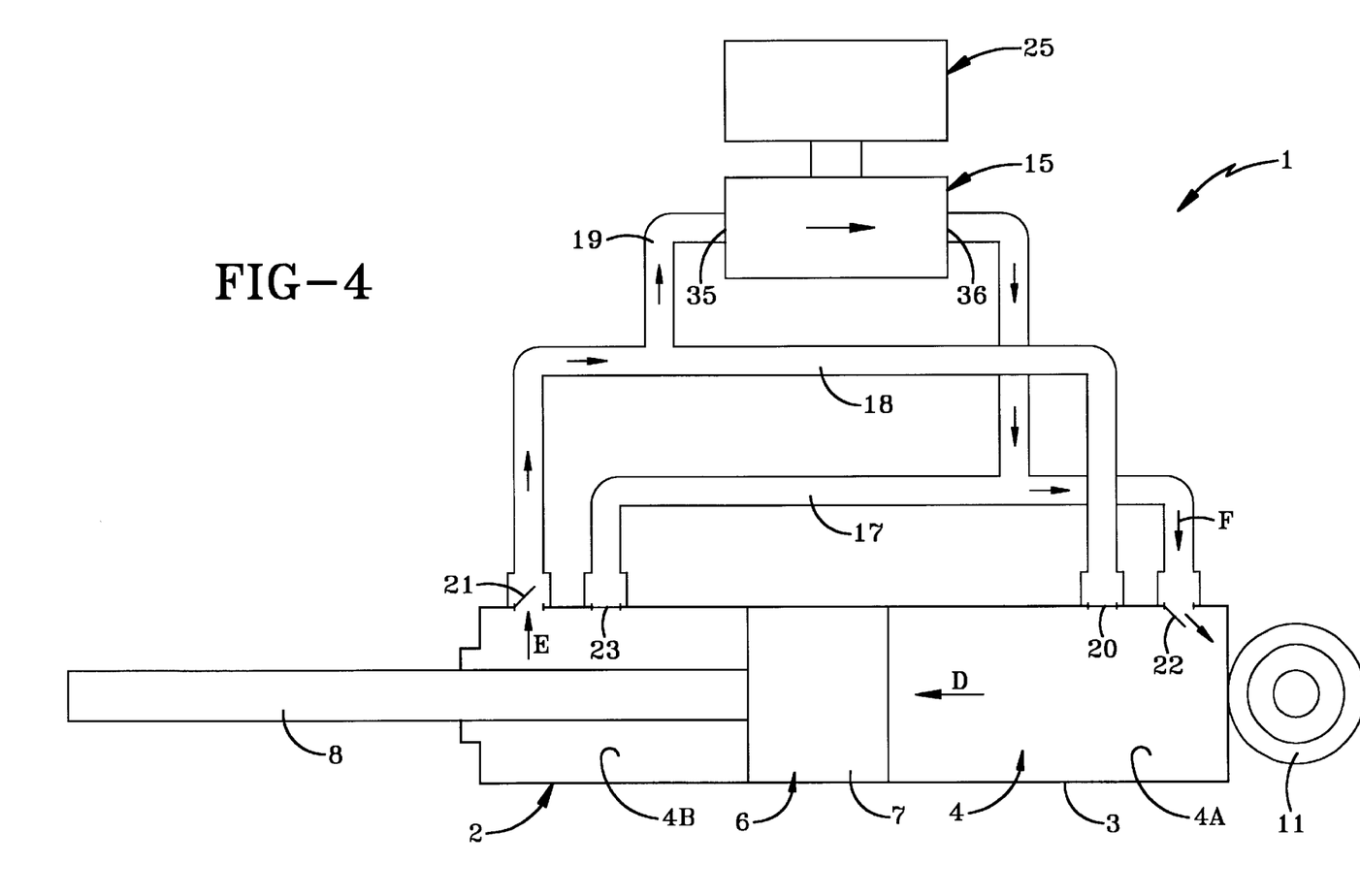
FIG. 4 is a diagrammatic view similar to FIG. 3 showing the movement of the hydraulic fluid as the piston is moving toward the left end of the cylinder.

In accordance with the invention, a hydraulic motor indicated generally at 15, is located externally of housing 3 and is in fluid communication with subchambers 4A and 4B by a plurality of fluid lines 17, 18 and 19. As shown in FIGS. 3 and 4, fluid lines 17 and 18 extend between and are in fluid communication with subchambers 4A and 4B, with fluid line 19 extending between hydraulic motor 15 and each of the fluid lines 17 and 18. One-way check valves 20 and 21 are located at the fluid openings of subchambers 4A and 4B respectively, which communicate with fluid line 18 (FIGS. 3 and 4). A second pair of similar one-way check valves 22 and 23 are located at the fluid openings with chambers 4A and 4B respectively and fluid line 17. The function of these one-way check valves is best shown in FIGS. 3 and 4 and is described in further detail below.

Figure 5:
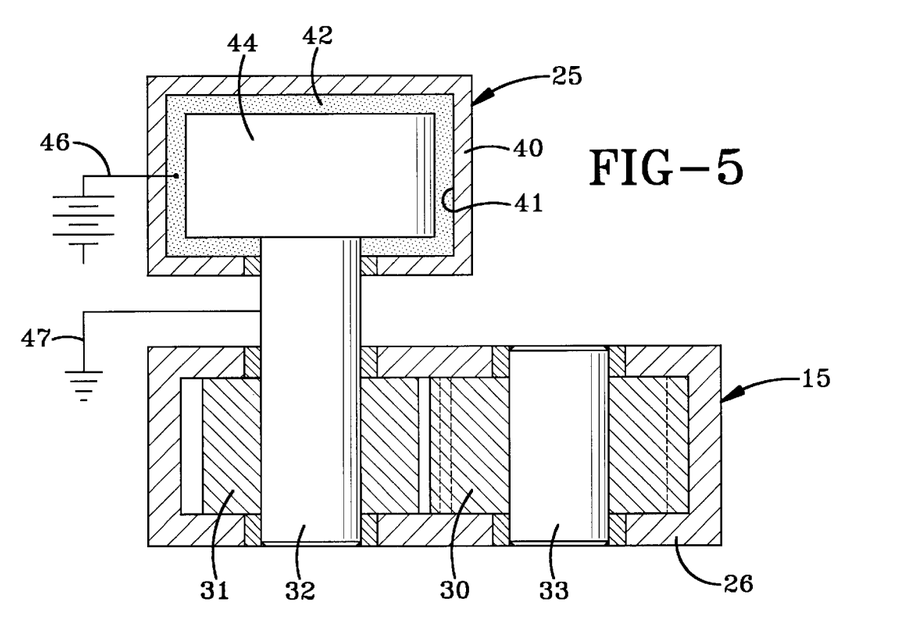
FIG. 5 is an enlarged fragmentary sectional view taken on line 5—5, FIG. 1.
Figure 6:
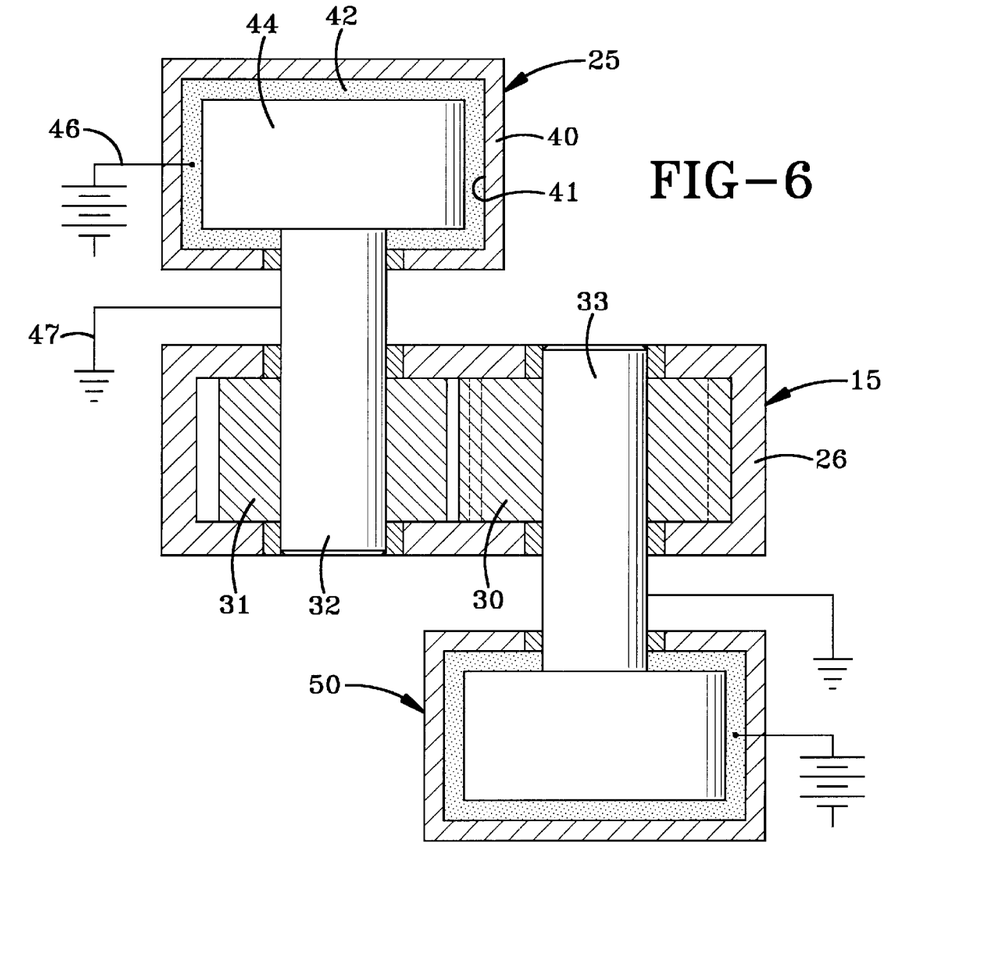
FIG. 6 is an enlarged fragmentary sectional view similar to FIG. 5 showing the hydraulic motor connected to two ER flow cells.

In further accordance with the invention, a flow-cell indicated generally at 25, is operatively connected with hydraulic motor 15, two types of which are shown in detail in FIGS. 5 and 6.

Hydraulic motor 15 (FIG. 2) is of a usual construction and includes a housing 26 formed with an internal fluid reservoir 27 in which is rotatably mounted a pair of gears 30 and 31 by a pair of shafts 32 and 33, respectively. The operation of gears 30 and 31 in hydraulic motor 15, is well known wherein it develops a flow through the motor by carrying fluid around the teeth 34 and the walls of reservoir 27. The fluid flows into to fill the space and is carried around the outside of the gears as the gears mesh, and is forced out of the outlet 36. In the particular embodiment shown in FIG. 2, the inlet port is indicated at 35 with the outlet port being indicated at 36. The incoming hydraulic fluid is shown at A and the outgoing fluid shown at B which will be the flow pattern for the embodiment shown in FIGS. 3 and 4.

Flow cell 25 is shown in FIG. 5 as a couette cell. Cell 25 has an outer housing 40 which forms an internal chamber or reservoir 41, which contains a supply of a field responsive fluid 42, such as an electrorheological and/or magnetorheological fluid, hereinafter referred to as an ER fluid. A cylinder or other type of vane member 44 is rotatably mounted within chamber 41 by shaft 32 of hydraulic motor 15. A positive electrode 46 communicates with ER fluid 42 and a ground electrode 47 communicates with shaft 32 or vane 44.

Figure 1:
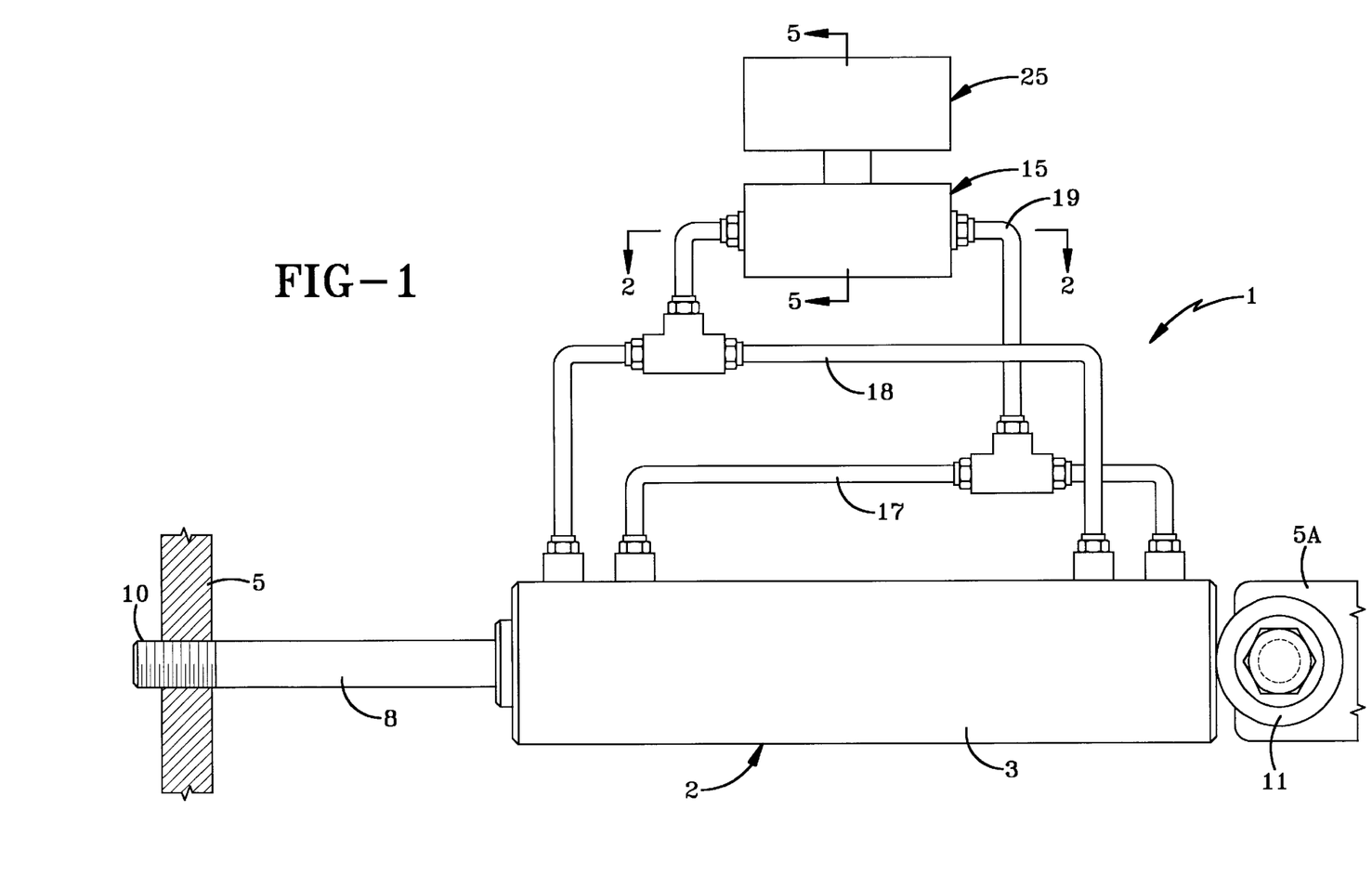
FIG. 1 is a side elevational view of the damping system of the present invention.
Figure 2:
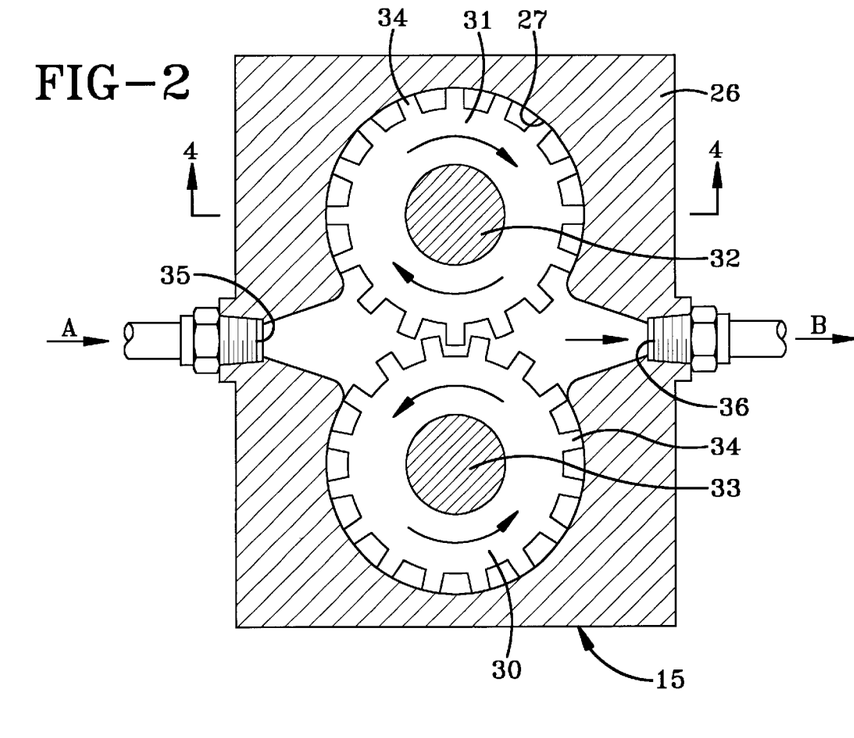
FIG. 2 is an enlarged fragmentary sectional view taken on line 2—2, FIG. 1.

The operation of the improved hydraulic damping system is shown diagrammatically in FIGS. 3 and 4. FIG. 3 shows the movement of piston 7 in the right-hand direction as shown by arrow A. Piston 7 forces the hydraulic oil into fluid line 18 through one-way check valve 20 as indicated by arrow B, with check valve 22 preventing the flow of fluid from subchamber 4A into line 17. The fluid flows through fluid line 18 and into hydraulic motor 15 through inlet port 35 as shown in FIG. 2, and is prevented from flowing into subchamber 4B by one-way check valve 20. Thus, as piston 7 moves to the right, the hydraulic fluid contained in subchamber 4A flows through a portion of fluid line 18 and into hydraulic motor 15 where it flows through fluid reservoir 27 and around the gear teeth and out through outlet 36 as shown by arrow D, and through fluid line 19 and into a portion of fluid line 17 where it flows into subchamber 4B through one-way check valve 23. This return fluid is prevented from entering subchamber 4A by one-way check valve 22.

In accordance with one of the main features of the invention as shown in FIGS. 2 and 5, the passing of the hydraulic fluid through hydraulic motor 15, causes the rotation of shaft 22 which in turn rotates cylinder or vane 44 within flow cell 25. Depending upon the amount of voltage or electric field applied to ER fluid 42, it will control the rotation of vane 44 and correspondingly of shaft 32 and attached gear 31. The speed of rotation of gear 31 in turn controls the rotation of gear 30 and thus the velocity of the hydraulic fluid passing through hydraulic motor 15. This will change the pressure drop across the hydraulic motor and enhance the damping force by controlling the speed of cylinder 7 sliding within the hydraulic housing or cylinder 3.

FIG. 4 shows the operation of system 1 when piston 7 moves in the direction of arrow D or towards the left end of fluid chamber 4. In this situation, check valve 21 opens permitting the fluid to flow as shown by arrow E into a portion of fluid line 18 and correspondingly into line 19 but is prevented from flowing into subchamber 4A by check valve 20 being closed. Thus, the fluid flows through hydraulic motor 15 in the same direction as that described above with respect to FIG. 5, that is through inlet port 35 and out through outlet port 36 where it then moves into subchamber 4A through open check valve 22 as shown by arrows F. Again, the strength of the electrical field applied to the ER fluid 42 will control the speed of 25 piston 7 by controlling the rotation of shaft 32 and gear 31. Likewise, the hydraulic fluid flowing through line 17 is prevented from flowing into subchamber 4B by one-way check valve 23.

Thus, hydraulic damper 2 functions much like any conventional tube type damper wherein the piston rod is axially movable within the damper body and a force which is applied to the piston rod, such as shown by arrow G (FIG. 3) begins to move the piston 7 to the right of housing 3. Since the flow of the hydraulic fluid through hydraulic motor 15 requires mechanical work by the fluid, a pressure difference is created between the two ends of the piston which acts on the face of the piston to create a resistive (damping) force that acts in a direction opposite to the force that initiated the damper motion. The magnitude of this force is determined by many designed parameters including the physical dimensions of the damper components, hydraulic motor characteristics, material properties of the hydraulic oil (e.g. viscosity) and the resistive force generated by the ER fluid in flow cell 25.

It is the field responsive fluid characteristics that gives rise to the adjustability of the damper. When there is no electric field applied, the ER fluid can generate moderately low stresses and thus the damping force or given motion is at its minimum. When the electrical or magnetic field is applied, the fluid becomes significantly more viscous and/or develops a large static and dynamic yield stress. This extra stress manifests itself in larger resistive forces to the motion of the hydraulic motor, and thus it increases the pressure drop and consequently damping force.

FIG. 6 shows a modified hydraulic motor/flow cell combination wherein shaft 33 of hydraulic motor 15 is connected to a second flow cell 50, which preferably is similar to flow cell 25 discussed above, but not required. Thus, this arrangement enables larger resistive forces to be applied to the flow of hydraulic fluid through motor 15 by providing a positive breaking action to the rotation of both gears 30 and 31 instead of just to gear 31 discussed above in the embodiment of FIG. 5. The configuration of FIG. 6 may be incorporated into the arrangement shown in FIGS. 1, 3 and 4 or can be incorporated into a modified damping system indicated generally at 52 and shown in FIG. 7.

Figure 7:
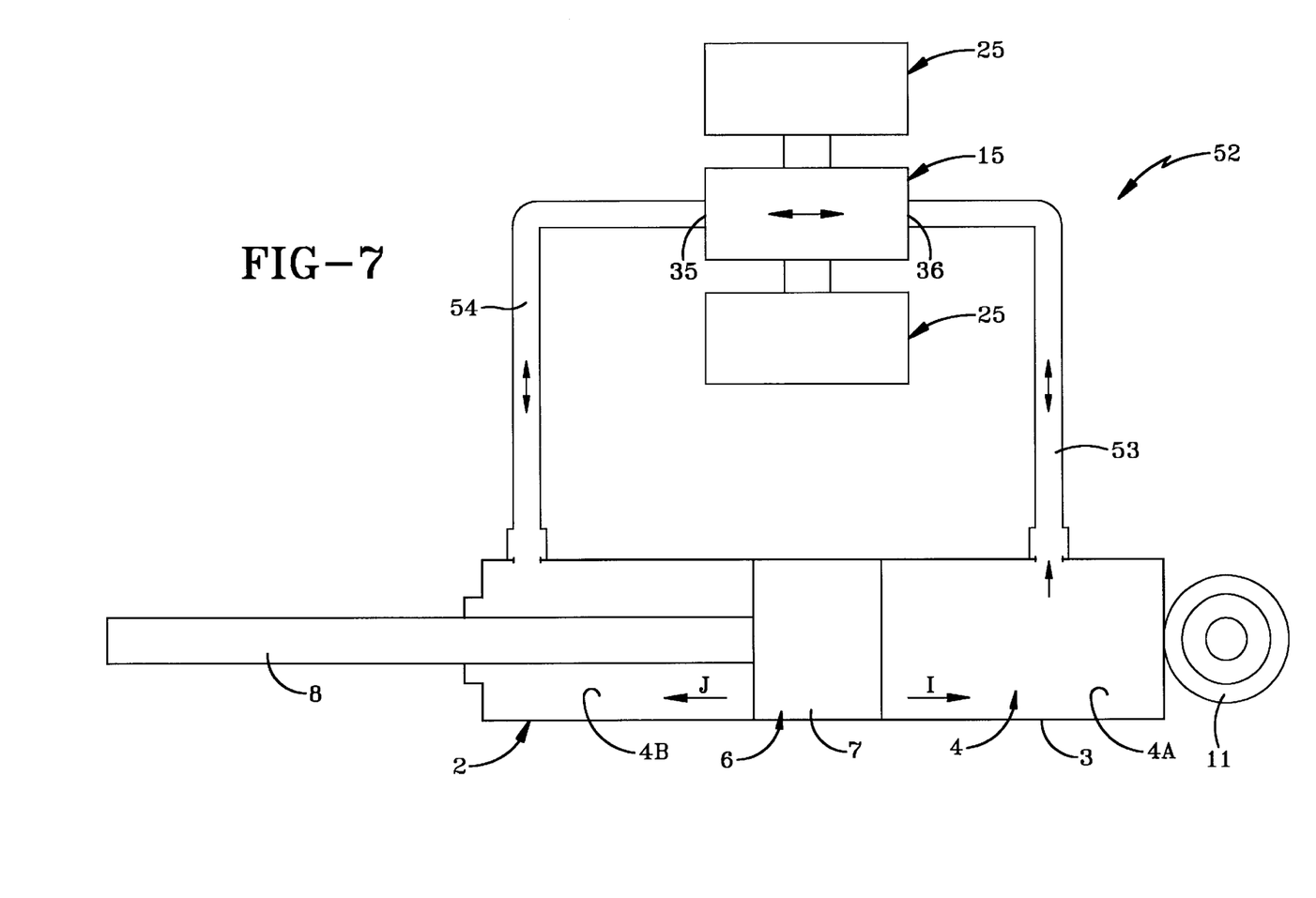
FIG. 7 is a diagrammatic elevational view similar to FIG. 1, showing a second embodiment of the subject damping system.

Embodiment 52 includes the same hydraulic damper 2 as that described above but includes a first fluid line 53 which connects subchambers 4A with motor 15 and a second fluid line 54 which connects motor 15 to subchamber 4B. Thus, as piston 7 moves in a certain direction such as shown by arrow 1, it will force the fluid from chamber 4A into fluid line 53 and through hydraulic motor 15 and back into subchamber 4B through fluid line 54. The reverse is true when piston 7 moves in the opposite direction in the direction of arrow J. Again, the velocity of the hydraulic fluid flowing through motor 15 is controlled by the strength of the electric field applied to one or more flow cells 25.

One of the important features which distinguishes the present invention over that of U.S. Pat. No. 5,161,653 is that any time during the movement of piston 7 the flow rate can be increased or decreased by varying the electric field applied to the ER fluid of cells 25. In the damper of U.S. Pat. No. 5,161,653, it is impossible to increase the damping force during the course of a stroke beyond that which is achieved by the valve position at switching time. This means that if the system is not fast enough to react to an event, damping performance may be compromised until the direction of the stroke is reversed.

Accordingly, the improved vibration damping system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vibration damping system is construed and used, the characteristics of the construction, and the advantageous, new and useful results obtained; the new and useful structures, devices, elements, arrangements, parts, combinations and method steps, are set forth in the appended claims.

What is claimed is:

1. A vibration damping system comprising:
    a hydraulic damper including a housing forming an internal hydraulic fluid chamber and a damping member slidably reciprocating within said chamber and dividing said chamber into a pair of subchambers, said damping member being adapted to be connected to a first support structure;
    connection means on the housing for connecting said housing to a second support structure spaced from said first support structure;

a hydraulic motor in fluid communication with the hydraulic damper for controlling the movement of hydraulic fluid between the subchambers upon movement of the damping member within the fluid chamber, said hydraulic motor including at least one element for transforming fluid motion of the hydraulic fluid into a rotary motion;

a fluid line providing the fluid communication between the hydraulic motor and the fluid subchambers, said motor being mounted in said fluid line whereby said hydraulic fluid flows through said motor; and a flow cell adapted to contain a field responsive fluid operatively connected to the hydraulic motor for controlling the amount of damping of the hydraulic damper by controlling the rotary motion of the hydraulic motor to regulate the amount of hydraulic fluid which passes through said hydraulic motor.

2. The vibration damping system defined in claim 1 including a plurality of control valves for controlling the direction of flow of the hydraulic fluid between the subchambers and the hydraulic motor.

3. The vibration damping system defined in claim 2 wherein the control valves are one-way check valves.

4. The vibration damping system defined in claim 1 wherein the fluid line includes first and second lines, each providing fluid communication between the pair of subchambers, and a third line which extends between the hydraulic motor and said first and second lines.

5. The vibration damping system defined in claim 1 wherein the fluid line extends directly from one of the subchambers to the hydraulic motor and then to the other of said subchambers.

6. The vibration damping system defined in claim 1 wherein the hydraulic motor includes a pair of rotatable meshing gears at least one of which forms said one element for transforming the fluid motion into the rotary motion; and in which said one gear includes a shaft operatively connected to the flow cell which controls the speed of rotation of said shaft and connected gear to control the amount of hydraulic fluid which passes through said motor.

7. The vibration damping system defined in claim 6 wherein each of the meshing gears has a shaft operatively connected to the flow cell.

8. The vibration damping system defined in claim 1 wherein the flow cell is a couette cell including a housing containing an ER fluid and a rotary member mounted therein.

9. The vibration damping system defined in claim 8 including electrode means for generating an electric field between a positive electrode and a negative electrode communicating with the ER fluid in the couette cell.

10. A vibration damping system including:
a hydraulic damper including a housing forming an internal hydraulic fluid chamber and a damping member slidably reciprocating within said chamber and dividing said chamber into a pair of subchambers, said damping member being adapted to be connected to a first support structure;

connection means on the housing for connecting said housing to a second support structure spaced from said first support structure;

a hydraulic motor having a fluid reservoir with an inlet port and an outlet port and containing a pair of shafts connected to rotating gears with meshing teeth for controlling the flow of hydraulic fluid through said motor;

fluid line means for fluidly connecting the inlet and outlet ports of the hydraulic motor to the subchambers;

a flow cell containing an ER fluid having a movable element in contact with said fluid, said movable member being coupled to at least one of the hydraulic motor shafts; and an electrode for applying an electric fluid to the ER fluid to effect the speed of movement of the movable member within the ER fluid and the rotation speed of the connected gear to control the velocity of the hydraulic fluid moving through the hydraulic motor.

11. The vibration damping system defined in claim 10 including a plurality of valves for controlling the direction of flow of the hydraulic fluid through the fluid line means.

12. The vibration damping system defined in claim 11 in which the fluid line means includes first and second fluid lines, said first line extending from the inlet port of the hydraulic motor to one of the subchambers and the second fluid line extending from the outlet port of the hydraulic motor to the other of said subchambers.

13. The vibration damping system defined in claim 11 in which the fluid line means includes first and second lines, each providing fluid communication between the pair of subchambers, and a third line which extends between the hydraulic motor and said first and second lines.

14. The vibration damping system defined in claim 11 in which the valves includes one-way check valves.

15. The vibration damping system defined in claim 10 wherein the flow cell is a couette cell having a pair of spaced concentric members one of which is rotatable with respect to the other; and in which the ER fluid is contained in the space between said members.

16. A method of controlling a hydraulic damper having a housing with an internal hydraulic fluid chamber containing hydraulic fluid and a slidably reciprocative damping member therein dividing the chamber into a pair of subchambers, said method including the steps of:

moving the damping member with respect to the housing to force the hydraulic fluid from one subchamber into the other subchamber when a force is applied on the damping member;

passing the hydraulic fluid through a hydraulic motor when moving the hydraulic fluid from one subchamber to the other subchamber;

rotating a component of the hydraulic motor by the pressure of the hydraulic fluid passing through the hydraulic motor as the hydraulic fluid moves between subchambers;

providing a flow cell containing a field responsive fluid;

operatively connecting the flow cell to the rotating component of the hydraulic motor; and applying a field to the field responsive fluid to change the viscosity of the fluid to control the rotation of the rotating component of the hydraulic motor thereby controlling the movement of the hydraulic fluid between the subchambers.

17. The method defined in claim 16 including the step of providing the rotating component of the hydraulic motor with a pair of meshing gears and a shaft connected to at least one of said gears.

18. The method defined in claim 17 including the step of providing the flow cell as a couette cell having a fluid reservoir and a rotatable member mounted therein; and
connecting the shaft of the hydraulic motor to said rotatable member.

19. The method defined in claim 16 including the step of providing check valves for controlling the direction of flow of the hydraulic fluid between the subchambers.

* * * * *